United States Patent
Sung et al.

(10) Patent No.: US 12,412,958 B2
(45) Date of Patent: Sep. 9, 2025

(54) SEPARATOR FOR ELECTROCHEMICAL DEVICE, AND ELECTROCHEMICAL DEVICE COMPRISING SAME

(71) Applicant: LG ENERGY SOLUTION, LTD., Seoul (KR)

(72) Inventors: Dong-Wook Sung, Daejeon (KR); Hye-Jin Kwon, Daejeon (KR); Sun-Yong Shin, Daejeon (KR); Jong-Yoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 540 days.

(21) Appl. No.: 17/776,503

(22) PCT Filed: Nov. 17, 2020

(86) PCT No.: PCT/KR2020/016206
§ 371 (c)(1),
(2) Date: May 12, 2022

(87) PCT Pub. No.: WO2021/101222
PCT Pub. Date: May 27, 2021

(65) Prior Publication Data
US 2022/0393304 A1    Dec. 8, 2022

(30) Foreign Application Priority Data
Nov. 19, 2019  (KR) .................. 10-2019-0148978

(51) Int. Cl.
*H01M 50/451* (2021.01)
*H01M 50/403* (2021.01)
(Continued)

(52) U.S. Cl.
CPC ....... *H01M 50/451* (2021.01); *H01M 50/403* (2021.01); *H01M 50/426* (2021.01); *H01M 50/431* (2021.01)

(58) Field of Classification Search
CPC ............. H01M 10/052; H01M 50/403; H01M 50/426; H01M 50/431; H01M 50/443;
(Continued)

(56) References Cited

U.S. PATENT DOCUMENTS

| 8,405,957 B2 | 3/2013 | Katayama et al. |
| 2009/0261835 A1 | 10/2009 | Iwanaga et al. |

(Continued)

FOREIGN PATENT DOCUMENTS

| EP | 4 050 720 A1 | 8/2022 |
| JP | 2011-512005 A | 4/2011 |

(Continued)

OTHER PUBLICATIONS

European Patent Office extended Search Report dated Nov. 18, 2022 for European Patent Application No. 20889718.1.

(Continued)

*Primary Examiner* — Victoria H Lynch
(74) *Attorney, Agent, or Firm* — Birch, Stewart, Kolasch & Birch, LLP (57) ABSTRACT

A separator for an electrochemical device having a low content of secondary particles formed by aggregation of inorganic particles in the inorganic coating layer. The separator has a low content of secondary particles protruding from the separator surface to a predetermined height. Since the inorganic particles are not aggregated but are distributed homogeneously in the inorganic coating layer, the separator has uniform dispersion of pressure over the whole surface of the separator, when it is applied to a battery and pressure is generated in the battery due to the charge/discharge of the (Continued)

battery. Deformation of the separator is minimized. When using a porous film as a separator substrate, there is a low tendency for intensive application of pressure from the secondary particles to a local site of the separator substrate, and thus the separator substrate is less damaged and the possibility of short-circuit generation is reduced.

13 Claims, 3 Drawing Sheets (51) Int. Cl.
  *H01M 50/426* (2021.01)
  *H01M 50/431* (2021.01)
(58) Field of Classification Search
  CPC ............ H01M 50/446; H01M 50/449; H01M 50/451; H01M 50/489; Y02E 60/10
  See application file for complete search history.

(56) References Cited

U.S. PATENT DOCUMENTS

| | | |
|---|---|---|
| 2009/0325058 A1 | 12/2009 | Katayama et al. |
| 2010/0221965 A1 | 9/2010 | Katayama et al. |
| 2013/0316219 A1 | 11/2013 | Ha et al. |
| 2014/0302389 A1 | 10/2014 | Hasegawa et al. |
| 2015/0024275 A1 | 1/2015 | Ishida et al. |
| 2016/0218340 A1 | 7/2016 | Ryu et al. |
| 2018/0147714 A1 | 5/2018 | Huskins et al. |
| 2018/0190958 A1 | 7/2018 | Yoon et al. |
| 2019/0280274 A1 | 9/2019 | Kim et al. |
| 2020/0185676 A1 | 6/2020 | Lee et al. |

FOREIGN PATENT DOCUMENTS

| | | |
|---|---|---|
| JP | 5158678 B2 | 3/2013 |
| JP | 6185133 B2 | 8/2017 |
| JP | 2017-177449 A | 10/2017 |
| KR | 10-2009-0004476 A | 1/2009 |
| KR | 10-2009-0111342 A | 10/2009 |
| KR | 10-1111710 B1 | 3/2012 |
| KR | 10-2015-0010556 A | 1/2015 |
| KR | 10-2015-0070979 A | 6/2015 |
| KR | 10-2016-0000894 A | 1/2016 |
| KR | 10-2016-0088973 A | 7/2016 |
| KR | 10-2019-0065468 A | 6/2019 |
| KR | 10-2019-0075659 A | 7/2019 |
| KR | 10-2019-0076913 A | 7/2019 |
| KR | 10-2019-0092316 A | 8/2019 |
| KR | 10-2019-0102572 A | 9/2019 |
| KR | 10-2019-0105881 A | 9/2019 |
| WO | WO 2013/073362 A1 | 5/2013 |
| WO | WO 2016/056288 A1 | 4/2016 |
| WO | WO 2017/170289 A1 | 10/2017 |

OTHER PUBLICATIONS

International Search Report for PCT/KR2020/016206 (PCT/ISA/210) mailed on Feb. 25, 2021.

SEPARATOR FOR ELECTROCHEMICAL DEVICE, AND ELECTROCHEMICAL DEVICE COMPRISING SAME

TECHNICAL FIELD

The present application claims priority to Korean Patent Application No. 10-2019-0148978 filed on Nov. 19, 2019 in the Republic of Korea. The present disclosure relates to a separator for an electrochemical device and an electrochemical device including the same. Particularly, the present disclosure relates to a separator having a small thickness, excellent adhesion and improved dielectric breakdown performance, and an electrochemical device including the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such lithium-ion batteries are disadvantageous in that they have safety-related problems, such as ignition and explosion, caused by the use of an organic electrolyte, and require a complicated manufacturing process.

More recently, lithium-ion polymer batteries have been regarded as one of the next-generation batteries, since they improve the above-mentioned shortcomings of lithium-ion batteries. However, lithium-ion polymer batteries still have a relatively lower capacity as compared to lithium-ion batteries, and particularly show insufficient discharge capacity at low temperature. Therefore, there is an imminent need for a solution capable of improving the above-mentioned problems.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

Figure 1:
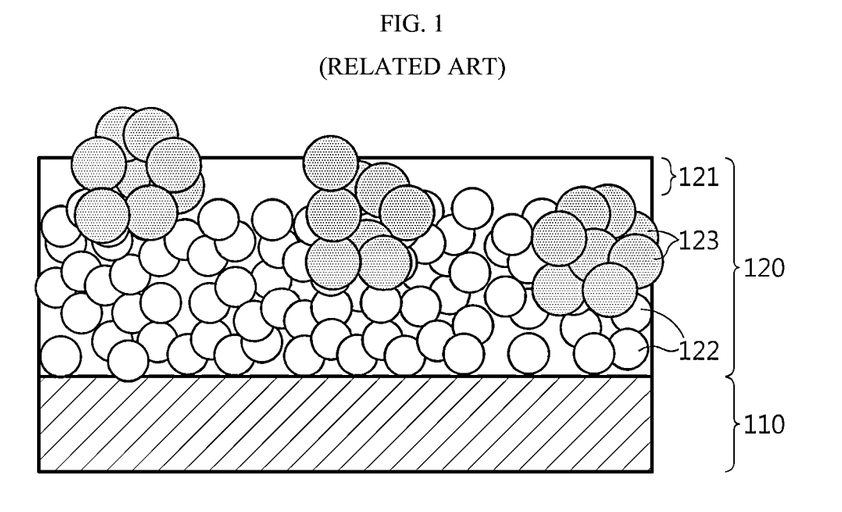
FIG. 1 is a schematic view illustrating the section of a separator according to the related art, wherein inorganic particles are aggregated with one another to form secondary particles remaining on the separator.

To solve the above-mentioned safety problems of an electrochemical device, there has been suggested a separator having a porous coating layer formed by coating a mixture containing inorganic particles and a binder polymer on at least one surface of a porous separator sheet (substrate). Since the inorganic particles contained in the inorganic coating layer have higher heat resistance as compared to polymer materials, it is possible to obtain an effect of preventing a short-circuit between a positive electrode and a negative electrode, even when an electrochemical device is overheated, unlike a separator using a substrate including a polymer material alone. However, as shown in FIG. 1, there is a problem in that the inorganic particles introduced to the coating layer are not dispersed homogeneously in slurry during the preparation of slurry for forming an inorganic coating layer but are concentrated locally or aggregated with one another. This inhibits thin filming of separators and results in generation of a hi-pot defect. Under these circumstances, there is an increasing need for developing a separator, which is amenable to thin filming, reduces generation of aggregation of secondary particles and has excellent dielectric breakdown performance.

DISCLOSURE

Technical Problem

The present disclosure is designed to solve the problems of the related art, and therefore the present disclosure is directed to providing a separator for an electrochemical device, which has a low content of secondary particles, i.e. aggregates of inorganic particles, in an inorganic coating layer, and shows a high dielectric breakdown voltage to provide a low hi-pot defect generation ratio. The present disclosure is also directed to providing a method for manufacturing the above-mentioned separator. It will be easily understood that the objects and advantages of the present disclosure may be realized by the means shown in the appended claims and combinations thereof.

Technical Solution

According to the first embodiment of the present disclosure, there is provided a separator for an electrochemical device, including: a porous substrate having a plurality of pores; and a porous inorganic coating layer on one surface or both surfaces of the porous substrate, wherein the porous inorganic coating layer includes a plurality of inorganic particles and a binder resin positioned on the whole or a part of the surface of the inorganic particles to connect and fix the inorganic particles with one another, wherein the inorganic particles are present in an amount of 50 wt % or more based on 100 wt % of the total weight of the inorganic coating layer, and the separator has a ratio (A) defined by the following Formula 1 of 70% or more:

ratio (A) (%)=[(initial dielectric breakdown voltage before compression−dielectric breakdown voltage after compression)/(initial dielectric breakdown voltage before compression)]×100, [Formula 1]

wherein the initial dielectric breakdown voltage before compression is a voltage where a short-circuit occurs, when the separator is subjected to voltage boosting at a predetermined rate by applying DC current thereto, and the dielectric breakdown voltage after compression is a voltage where a short-circuit occurs, when the separator is subjected voltage boosting at a predetermined ratio by applying DC current thereto, while pressurizing the separator in a range of 1 MPa to 10 MPa.

According to the second embodiment of the present disclosure, there is provided the separator for an electrochemical device as defined in the first embodiment, which has no secondary particles are present on a surface of the inorganic coating layer, or the secondary particles have a diameter of 50 μm or less, wherein the secondary particles are aggregates of a plurality of primary particles.

According to the third embodiment of the present disclosure, there is provided the separator for an electrochemical device as defined in the first or the second embodiment, which has no secondary particles are present on a surface of the inorganic coating layer, or the secondary particles have a diameter of 50 μm or less and protrude from the separator surface to a height of 3 μm or less, wherein the secondary particles are aggregates of a plurality of primary particles.

According to the fourth embodiment of the present disclosure, there is provided the separator for an electrochemical device as defined in any one of the first to the third embodiments, which an adhesion to an electrode of 15 gf/25 mm to 200 gf/25 mm.

According to the fifth embodiment of the present disclosure, there is provided the separator for an electrochemical device as defined in any one of the first to the fourth embodiments, wherein the binder resin includes a fluorinated binder resin, and the fluorinated binder resin includes any one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene, or a mixture of two or more of them.

According to the sixth embodiment of the present disclosure, there is provided the separator for an electrochemical device as defined in the fifth embodiment, wherein the fluorinated binder resin has a molecular weight of 200,000-1,500,000.

According to the seventh embodiment of the present disclosure, there is provided the separator for an electrochemical device as defined in the sixth embodiment, wherein the fluorinated binder resin is polyvinylidene fluoride-co-hexafluoropropylene (PVDF-HFP) and has a substitution ratio with HFP ranging from 3 wt % to 30 wt %.

According to the eighth embodiment of the present disclosure, there is provided an electrochemical device including a positive electrode, a negative electrode and a separator interposed between the positive electrode and the negative electrode, wherein the separator is the same as defined in any one of the first to the seventh embodiments.

According to the ninth embodiment of the present disclosure, there is provided the electrochemical device as defined in the eighth embodiment, which is a lithium secondary battery.

According to the tenth embodiment of the present disclosure, there is provided a method for manufacturing a separator for an electrochemical device, including the steps of: preparing a composition including a solvent, inorganic particles and a binder resin; and applying the composition to the surface of a porous substrate to form an inorganic coating layer, and drying the inorganic coating layer, wherein the composition is prepared by adding the inorganic particles and the binder resin to the solvent, followed by agitating the composition, the prepared composition includes composite particles which have at least one of a particle diameter ($D_{50}$) of 2.5 μm or less or a particle diameter ($D_{99}$) of 35 μm or less, and the composite particle is formed by aggregation of the inorganic particles and/or the binder resin in the composition.

According to the eleventh embodiment of the present disclosure, there is provided the method for manufacturing a separator for an electrochemical device as defined in the tenth embodiment, wherein the binder resin includes a fluorinated binder resin, and the fluorinated binder resin includes any one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene, or a mixture of two or more of them.

According to the twelfth embodiment of the present disclosure, there is provided the method for manufacturing a separator for an electrochemical device as defined in the eleventh embodiment, wherein the fluorinated binder resin has a molecular weight of 200,000-1,500,000.

According to the thirteenth embodiment of the present disclosure, there is provided the method for manufacturing a separator for an electrochemical device as defined in the twelfth embodiment, wherein the fluorinated binder resin is PVDF-HFP and has a substitution ratio with HFP of 3-30 wt %.

Advantageous Effects

The separator for an electrochemical device according to the present disclosure has a low content of secondary particles formed by aggregation of the inorganic particles in the inorganic coating layer. Particularly, the separator has a low content of secondary particles protruding from the separator surface to a predetermined height or more. Since the inorganic particles are not aggregated but are distributed homogeneously in the inorganic coating layer, the separator according to the present disclosure allows uniform dispersion of pressure over the whole surface of the separator, when it is applied to a battery and pressure is generated in the battery due to the charge/discharge of the battery. In this manner, it is possible to minimize deformation of the separator. Meanwhile, when using a porous film made of a polymer material as a separator substrate, there is a low tendency for intensive application of pressure from the secondary particles to a local site of the separator substrate, and thus the separator substrate is less damaged and a possibility of short-circuit generation is reduced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

The present disclosure relates to a separator for an electrochemical device. According to the present disclosure, the electrochemical device means a device converting chemical energy into electrical energy by electrochemical reactions, and has a concept covering a primary battery and a secondary battery. In addition, the secondary battery is a rechargeable battery, and has a concept covering a lithium-ion battery, nickel-cadmium battery, nickel-hydrogen battery, or the like. According to an embodiment of the present disclosure, the secondary battery may be a lithium-ion secondary battery.

In one aspect of the present disclosure, there is provided a separator for an electrochemical device, including: a porous substrate having a plurality of pores; and a porous inorganic coating layer formed on at least one surface or both surfaces of the porous substrate and containing a plurality of inorganic particles and a binder resin positioned on the whole or a part of the surface of the inorganic particles to connect the inorganic particles with one another and fix them, wherein the inorganic particles are present in an amount of 50 wt % or more based on 100 wt % of the total weight of the inorganic coating layer.

In addition, according to the present disclosure, the separator is characterized in that it has a high dielectric breakdown voltage. According to an embodiment of the present disclosure, the separator has a ratio (A) defined by the following Formula 1 of 70% or more. The ratio (A) can be calculated according to the following Formula 1.

Ratio (A) (%)=[(Initial dielectric breakdown voltage before compression−Dielectric breakdown voltage after compression)/(Initial dielectric breakdown voltage before compression)]×100    [Formula 1]

The initial dielectric breakdown voltage before compression means a voltage where a short-circuit occurs, when the separator to be analyzed is subjected to voltage boosting at a predetermined rate by applying DC current thereto. The initial dielectric breakdown voltage before compression may be determined at a temperature of 70-90° C. In addition, 0.1 mA or more of DC current may be applied and voltage boosting may be carried out at a rate of 10-150 V/s. Herein, the voltage may be 3 kV and the ramp up time may be 30 seconds.

In addition, the dielectric breakdown voltage after compression means a voltage where a short-circuit occurs, when the separator is subjected to voltage boosting at a predetermined ratio by applying DC current thereto, while pressurizing the separator in a range of 1 MPa to 10 MPa. The dielectric breakdown voltage after compression may be determined at a temperature of 70-90° C. In addition, 0.1 mA or more of DC current may be applied and voltage boosting may be carried out at a rate of 10-150 V/s. Herein, the voltage may be 3 kV and the ramp up time may be 30 seconds.

According to an embodiment of the present disclosure, the initial dielectric breakdown voltage before compression means a voltage where a short-circuit occurs, when DC current of 0.5 mA is subjected to voltage boosting at a rate of 100 V/s (voltage 3 kV, ramp up time 30 seconds) at a temperature of 70-90° C. In addition, the dielectric breakdown voltage after compression means a voltage where a short-circuit occurs, when DC current of 0.5 mA is subjected to voltage boosting at a rate of 100 V/s (voltage 3 kV, ramp up time 30 seconds) at a temperature of 70-90° C., while pressurizing the separator in a range of 1 MPa to 10 MPa.

Meanwhile, according to the present disclosure, the dielectric breakdown voltage refers to the highest voltage that an insulator can withstand, and dielectric breakdown means that an insulator is broken and loses its dielectric property at a specific value of voltage or higher, when voltage is applied to the insulator. In other words, the voltage resistance of a separator can be determined by measuring the dielectric breakdown voltage of the separator. According to an embodiment of the present disclosure, the dielectric breakdown voltage may be determined by disposing a separator as an insulator between two conductors and applying voltage thereto to measure the voltage where dielectric breakdown occurs. For example, the dielectric breakdown voltage may be determined by using AC/DC/IR Hi-Pot tester. Particularly, a porous substrate is disposed between an aluminum bottom jig and a cylindrical electrode bar, DC current is set to 0.5 mA, and a voltage boosting rate is set to 100 V/s (voltage 3 kV, ramp up time 30 seconds). Once the test is started, determination is completed when a short-circuit occurs during the voltage boosting, and the voltage at this point is defined as dielectric breakdown voltage. Herein, when dielectric breakdown voltage after compression of a separator is determined, a predetermined range of pressure may be applied to the separator as described above.

Meanwhile, according to an embodiment of the present disclosure, the separator shows an adhesion (adhesion to an electrode) of 15 gf/25 mm to 200 gf/25 mm between the separator and an electrode.

The reason why the separator according to the present disclosure has a high dielectric breakdown voltage and/or the above-defined range of adhesion to an electrode even after compression is that the content of secondary particles in the inorganic coating layer is controlled to a low level. Particularly, the separator has a uniform surface, since protrusion of the secondary particles from the surface of the inorganic coating layer is controlled.

According to an embodiment of the present disclosure, the separator has no secondary particles as observed from the surface of the inorganic coating layer, or the secondary particles observed therefrom have a diameter of 50 μm or less. Preferably, the separator has no secondary particles as observed from the surface of the inorganic coating layer, or the secondary particles observed therefrom have a diameter of 30 μm or less. More preferably, the separator has no secondary particles as observed from the surface of the inorganic coating layer, or the secondary particles observed therefrom have a diameter of 10 μm or less. In other words, when the inorganic coating layer according to the present disclosure is observed from the surface thereof, no secondary particles are observed, of if any secondary particles are present, the secondary particles have a diameter of 50 μm or less, preferably 30 μm or less, and more preferably 10 μm or less. Herein, the diameter means the largest diameter of each particle.

According to an embodiment of the present disclosure, when the separator is observed from the surface of the inorganic coating layer, the number of secondary particles observed therefrom on the basis of 1.5×2 cm and having a diameter of 50 μm or less, preferably 30 μm or less, and more preferably 10 μm or less is 30 or less, preferably 10 or less. Further, when the separator is observed from the surface of the inorganic coating layer, no secondary particles are observed, or the secondary particles observed therefrom have a diameter controlled within the above-defined range and protrude from the separator surface to a height of 3 μm or less. In other words, when the separator is observed from the surface of the inorganic coating layer, no secondary particles are observed, or the secondary particles observed therefrom have a protruding height of 3 μm or less.

According to an embodiment of the present disclosure, the surface of the inorganic coating layer may be observed by using an analyzer, such as FESEM-Optical profiler (×100 times) to determine the diameter and protruding height. The protruding height of the secondary particles may be determined by measuring the highest-lowest height. The height of the secondary particles may be calculated based on the portion having the largest difference between the highest height and the lowest height during the analysis using the optical profiler.

Figure 2:
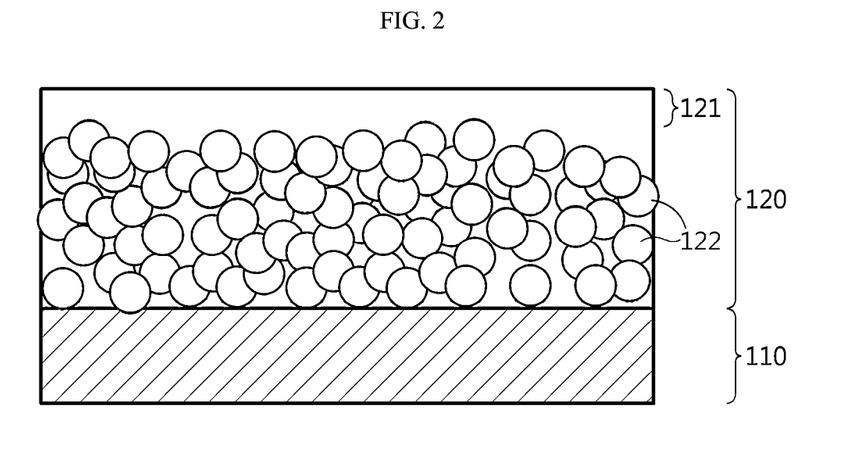
FIG. 2 is a schematic view illustrating the section of the separator according to an embodiment of the present disclosure.

According to the present disclosure, the secondary particles mean aggregates formed by aggregation of two or more inorganic particles in the form of independent single primary particles, and are differentiated from the independent primary particles bound to one another by means of a binder resin. FIG. 1 is a schematic view illustrating the section of a separator according to the related art, wherein secondary particle-type aggregates 123 formed by aggregation of inorganic particles remain. On the contrary, FIG. 2 is a schematic view illustrating the separator according to an embodiment of the present disclosure, wherein inorganic particles are not aggregated but are distributed homogeneously on the inorganic coating layer of the separator in the state of primary particles 122.

According to an embodiment of the present disclosure, in the inorganic coating layer, the inorganic particles are bound to one another and integrated with one another by means of a binder resin, wherein the interstitial volumes among the inorganic particles may form pores. As used herein, 'interstitial volume' means a space defined by the inorganic particles facing each other substantially in a closely packed or densely packed structure of the inorganic particles.

Figure 3:
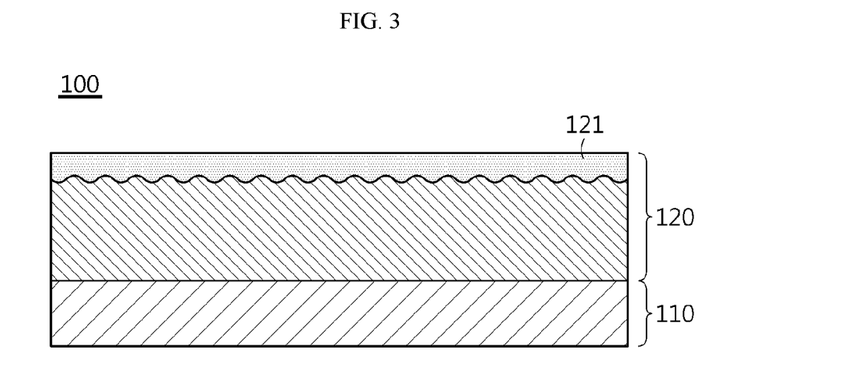
FIG. 3 is a schematic view illustrating the section of a separator having an electrode adhesive portion according to an embodiment of the present disclosure.

Meanwhile, according to the present disclosure, the inorganic coating layer is provided with an electrode adhesive portion 121 having a high content of binder resin on the surface thereof by virtue of the characteristics of the method for manufacturing the separator as described hereinafter. FIG. 3 is a schematic view illustrating the sectional structure of the separator 100 according to an embodiment of the present disclosure. Referring to FIG. 3, the separator according to the present disclosure includes an inorganic coating layer 120 formed on the surface of a separator substrate 110, wherein the binder resin is distributed at a higher concentration at the top layer portion of the inorganic coating layer as compared to the other portions. For the convenience of description, the top layer portion in which the binder resin is distributed at a higher concentration will be referred to as 'electrode adhesive portion 121' hereinafter. According to an embodiment of the present disclosure, the electrode adhesive portion results from the migration of the binder resin toward the top layer portion through a process, such as humidified phase separation. Therefore, the electrode adhesive portion is not a structure separated physically from the inorganic coating layer but is bound integrally and indivisibly to the surface of the inorganic coating layer as a part of the inorganic coating layer. In addition, the thickness of the electrode adhesive portion may not be uniform, since the electrode adhesive portion is a product resulting from humidified phase separation. According to an embodiment of the present disclosure, the electrode adhesive portion may be defined as a portion containing the binder resin in an amount of 70 wt % or more, preferably 85 wt % or more, from the topmost portion in the thickness direction of the inorganic coating layer. Meanwhile, each drawing numeral may be applied commonly to FIG. 1 to FIG. 3.

Meanwhile, according to the present disclosure, the porous coating layer may have a total thickness controlled suitably in a range of 2-10 μm based on both surfaces of the separator substrate.

The inorganic particles may be present in an amount of 50 wt % or more, preferably 70 wt % or more, based on the total weight of the inorganic coating layer. Meanwhile, the inorganic particles may be present in an amount of 97 wt % or less based on the total weight of the inorganic coating layer. When the inorganic particles are present in an amount of less than 50 wt %, an excessive amount of binder resin is present in the pores of the inorganic coating layer to cause a decrease in pore size and porosity. Meanwhile, when the amount of the binder resin is excessively small, it can cause a degradation of the peeling resistance and/or adhesion to an electrode of the inorganic coating layer. The peeling resistance means the adhesion between the separator substrate and the inorganic coating layer, and the adhesion to an electrode means the adhesion between the separator and an electrode.

According to an embodiment of the present disclosure, the inorganic coating layer may include a fluorinated binder resin as a binder resin. The fluorinated binder resin may include a polyvinylidene fluoride (PVDF)-based polymer.

Such a PVDF-based polymer is not particularly limited, but particular examples thereof may include polyvinylidene fluoride homopolymer, polyvinylidene fluoride-co-hexafluoropropylene, polyvinylidene fluoride-co-trichloroethylene, polyvinylidene fluoride-co-chlorotrifluoroethylene, or the like. At least one selected from the above PVDF-based polymers may be used. Besides the PVdF-based polymers, PVdF-based copolymers including a vinylidene fluoride repeating unit (A) and another repeating unit (B) copolymerizable with the repeating unit may be used.

According to an embodiment of the present disclosure, the fluorinated binder preferably has a molecular weight (Mw) of 200,000-1,500,000. Meanwhile, when the fluorinated binder is PVDF-HFP, which is a copolymer including a vinylidene fluoride repeating unit (A) and another repeating unit (B), such as hexafluoropropylene (HFP), copolymerizable with the repeating unit, the copolymer may have a degree of substitution with HFP of 3-30 wt %.

According to the present disclosure, the term 'molecular weight' refers to weight average molecular weight (Mw). According to an embodiment of the present disclosure, the molecular weight (Mw) may be determined by using gel permeation chromatography (GPC). For example, 200 mg of a polymer resin to be analyzed is diluted in 200 mL of a solvent, such as tetrahydrofuran (THF) to prepare a sample having a concentration of about 1000 ppm, and the molecular weight may be determined by using an Agilent 1200 series GPC instrument at a flow rate of 1 mL/min through a refractive index (RI) detector. Meanwhile, the degree of substitution may be determined through $^1$H-NMR by using Varian 500 MHz NMR.

Meanwhile, if necessary, the inorganic coating layer may further include a second binder resin, such as an acrylate polymer having adhesive property, besides the fluorinated binder. The content of the second binder resin is controlled preferably to a range of 3-20 wt % based on 100 wt % of the total weight of the binder resins. For example, the second binder resin may be used in an amount of 5 wt % or more, or 10 wt % or more, within the above-defined range. Particular examples of the second binder resin may include polyacrylate, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxymethyl cellulose, or the like. At least one second binder resin selected from the above examples may be used.

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte. Non-limiting examples of the inorganic particles may include high-dielectric constant inorganic particles having a dielectric constant of 5 or more, preferably 10 or more, inorganic particles having lithium-ion transportability, or a mixture thereof. According to an embodiment of the present disclosure, non-limiting examples of the inorganic particles include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, AlOOH, $Al(OH)_3$, SiC, or a mixture thereof. Meanwhile, the inorganic particles may further include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride, $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), or a mixture of two or more of them.

According to an embodiment of the present disclosure, the inorganic particles may have a particle diameter ($D_{50}$) of 0.2-3 μm. For example, the inorganic particles may have a particle diameter ($D_{50}$) of 0.3 μm or more, or 0.5 μm or more. In combination with this, or independently from this, the inorganic particles may have a particle diameter ($D_{50}$) of 2 μm or less, 1.5 μm or less, or 1 μm or less.

According to the present disclosure, the porous substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate realizes a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polymers including polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the porous substrate, the porous substrate has a thickness of 1-100 μm, particularly 5-50 μm. Although there is no particular limitation in the size of the pores present in the porous substrate and porosity, the pore size and porosity may be 0.01-50 μm and 10-95%, respectively.

In addition to the above-described inorganic particles and binder resin, the separator according to the present disclosure may further include other additives, such as a flame retardant, a dispersing agent, or the like, if necessary, as ingredients of the inorganic coating layer.

The separator according to an embodiment of the present disclosure may be obtained by preparing a composition for forming an inorganic coating layer including inorganic particles and a binder resin, and applying the composition to at least one surface of a porous substrate, followed by drying.

First, the composition for forming an inorganic coating layer may be prepared by forming a polymer solution containing a binder resin dissolved in a solvent, adding inorganic particles to the polymer solution, and dispersing the inorganic particles therein.

The solvent is not particularly limited, as long as it can be mixed homogeneously with the binder resin. Non-limiting examples of the solvent include cyclohexane, mesitylene, dimethyl acetamide, dimethyl sulfone, dimethyl carbonate, acetone, tetrahydrofuran, methylene chloride, chloroform, dimethyl formamide, N-methyl-2-pyrrolidone (NMP), water, methyl ethyl ketone, methyl acetate, cyclohexanone, or the like. According to an embodiment of the present disclosure, the solvent may include at least one selected from the above examples.

Meanwhile, according to an embodiment of the present disclosure, the inorganic particles may be added, after they are pulverized to a predetermined average particle diameter in advance. In a variant, the inorganic particles may be added to the polymer solution and then dispersed therein, while they are controlled and pulverized to a predetermined average particle diameter through a ball milling process, or the like, thereby providing the composition for forming an inorganic coating layer. According to the present disclosure, the latter is more preferred in that primary particles in the composition are dispersed homogeneously and generation of secondary particles is reduced.

The solid content in the composition, except the solvent, may be controlled to less than 30 wt %.

Meanwhile, according to an embodiment of the present disclosure, the composition is a dispersed mixture including the binder resin and inorganic particles dispersed in the solvent, and may form composite particles as floc formed by aggregation of the binder resin and/or inorganic particles. According to the present disclosure, the particle diameter of the composite particles, aggregated floc, is controlled to reduce generation of secondary particles in the separator. According to an embodiment of the present disclosure, the composite particles in the composition preferably have a particle diameter ($D_{50}$) of 2.5 μm or less. In combination with this, or independently from this, the composite particles preferably have a particle diameter ($D_{99}$) of 35 μm or less. When preparing the composition, agitation and dispersion steps of the composition may be carried out, while controlling the processing conditions, such as agitation time, agitation speed, agitation direction, selection of a solvent, concentration of the composition, agitation number, or the like.

According to an embodiment of the present disclosure, the slurry preferably has a stress energy of 0.1-1.0 mJ and/or a stress number of 10 or more.

According to an embodiment of the present disclosure, the particle diameter ($D_{50}$) and the particle diameter ($D_{99}$) of the composite particles refer to integrated values from the side of smaller particles calculated based on the results of determination of the particle size distribution of particles after classification using a particle size analyzer. In other words, the integrated value 50% corresponds to the particle diameter ($D_{50}$) and the integrated value 90% corresponds to the particle diameter ($D_{99}$). Such particle size distribution can be determined by a diffraction or scattering intensity pattern generated upon the contact of light with the particles. As a particle size distribution analyzer, Microtrac 3000 or Microtrac HRA available from Nikkiso may be used. In addition, a cumulative size distribution curve may be derived from the results of determination.

Although there is no particular limitation in the process for coating the composition for forming an inorganic coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, a dip coating process includes dipping a substrate into a tank containing a composition to carry out coating and is capable of controlling the thickness of a coating layer depending on the concentration of the composition and the rate of removing the substrate from the tank. Further, in order to control the coating thickness more precisely, it is possible to carry out post-metering through a Mayer bar or the like, after dipping.

Then, the porous substrate coated with the composition for forming an inorganic coating layer may be dried in an oven, thereby forming an inorganic coating layer on the surface of the porous substrate. The inorganic coating layer may be formed on at least one surface of the porous substrate or on both surfaces thereof.

Meanwhile, an electrode adhesive portion may be formed on the surface of the inorganic coating layer. To form the electrode adhesive portion, the drying step may be carried out under a humidified condition. After applying the slurry to the surface of the separator substrate, the resultant product is allowed to stand under a relative humidity of about 30-80% for a predetermined time so that the binder resin may be solidified (dried). Herein, phase separation of the binder resin is induced. During the phase separation, the solvent migrates toward the surface portion of the inorganic coating layer and the binder resin migrates toward the surface portion of the inorganic coating layer along with the migration of the solvent. In this manner, the content of the binder resin on the top layer portion of the porous coating layer is increased. Then, the portion of the inorganic coating layer below the top layer portion of the porous coating layer is provided with porous property, while pores are formed from the interstitial volumes among the inorganic particles.

In the inorganic coating layer, the inorganic particles are bound to one another by the binder, while they are packed and are in contact with each other, thereby forming interstitial volumes among the inorganic particles, and the interstitial volumes among the inorganic particles become vacant spaces to form pores.

In other words, the binder resin attaches the inorganic particles to one another so that they may retain their binding states. For example, the binder resin connects the inorganic particles with one another and fixes them. In addition, the pores of the porous coating layer are those formed by the interstitial volumes among the inorganic particles which become vacant spaces. The spaces may be defined by the inorganic particles facing each other substantially in a closely packed or densely packed structure of the inorganic particles.

In addition, when the drying step is carried out under a humidified condition as mentioned above, the inorganic coating layer may further include an electrode adhesive portion having a high content of binder resin at the top layer portion thereof. Reference will be made to the above description about the electrode adhesive portion.

In another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium-ion secondary batteries, lithium polymer secondary batteries or lithium-ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

In still another aspect of the present disclosure, there are provided a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Manufacture Examples

The separators according to Examples and Comparative Examples were obtained by the following method.

Polyvinylidene fluoride-co-hexafluoropropylene (PVDF-HFP, HFP substitution ratio: 12 wt %, Mw 400,000) as a binder resin was added to acetone and dissolved therein at 50° C. for about 12 hours to prepare a polymer solution. Then, alumina ($Al_2O_3$) particles (powder) having a particle diameter ($D_{50}$) of 500 nm were added to the resultant polymer solution and dispersed therein to prepare a composition for an inorganic coating layer. Herein, the binder resin and the alumina particles were used at a weight ratio of 20:80, and the composition had a solid content of 20 wt % except acetone.

The resultant composition was coated on both surfaces of a polyethylene porous film (porosity 40%) having a thickness of 15 μm, through a dip coating process, and dried at 25° C. under a relative humidity of 40% to obtain a separator provided with an inorganic coating layer having a thickness of 6 μm. The thickness means the total thickness of the inorganic coating layers formed on both surface of the substrate.

Evaluation of Physical Properties of Separator

Each of the separators according to Examples 1-6 and Comparative Examples 1-3 was determined in terms of surface properties, slurry particle size and dielectric breakdown voltage. The results are shown in the following Table 1.

(1) Air Permeation Time

Gurley air permeability values were obtained according to the method of ASTM D726-94. Herein, 'Gurley' means resistance against air flow and is determined by a Gurley densometer. Each Gurley air permeability value defined herein is expressed by the time (second), i.e., air permeation time, required for 100 mL of air to pass through a section of 1 int under a pressure of 12.2 in $H_2O$.

(2) Particle Size Distribution of Composite Particles

In each of the compositions according to Examples and Comparative Examples, the particle size distribution of composite particles was determined by using Microtrac 3000.

(3) Observation of Separator Surface

The surface of the inorganic coating layer in each of the separators according to Examples and Comparative Examples was observed by using an instrument, such as FESEM-Optical profiler (×100 times). Each separator was prepared with a size of 1.5×2 cm. When the surface was analyzed by using the optical profiler, the height of secondary particles was calculated based on the portion having the largest level difference between the maximum height and the minimum height. In addition, the minimum height of the inorganic coating layer was taken as the surface portion of the inorganic coating layer, and the diameter of inorganic particles was determined based on the largest diameter of the secondary particles protruding from the surface portion.

Figure 4:
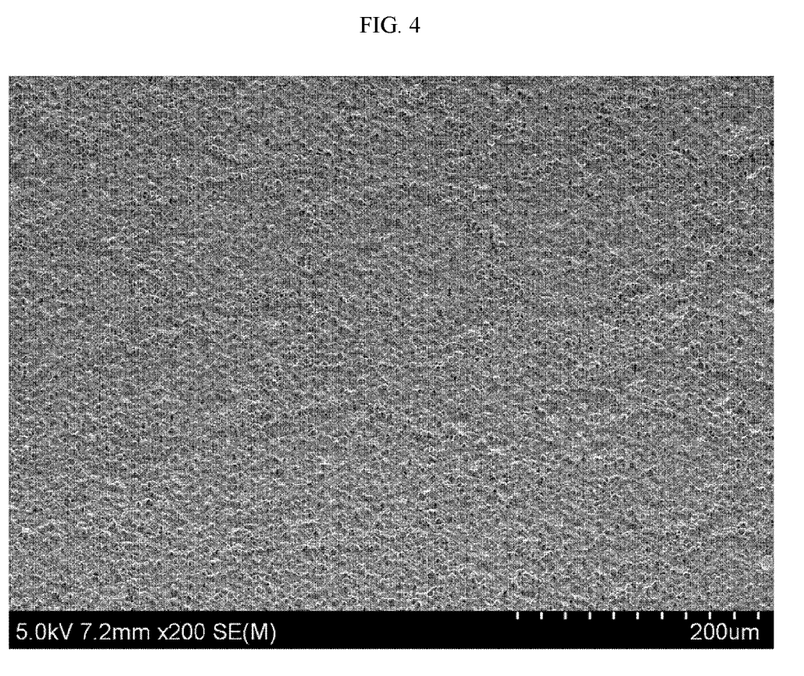
FIG. 4 is a scanning electron microscopic (SEM) image illustrating the surface of the separator according to Example 1.
Figure 5:
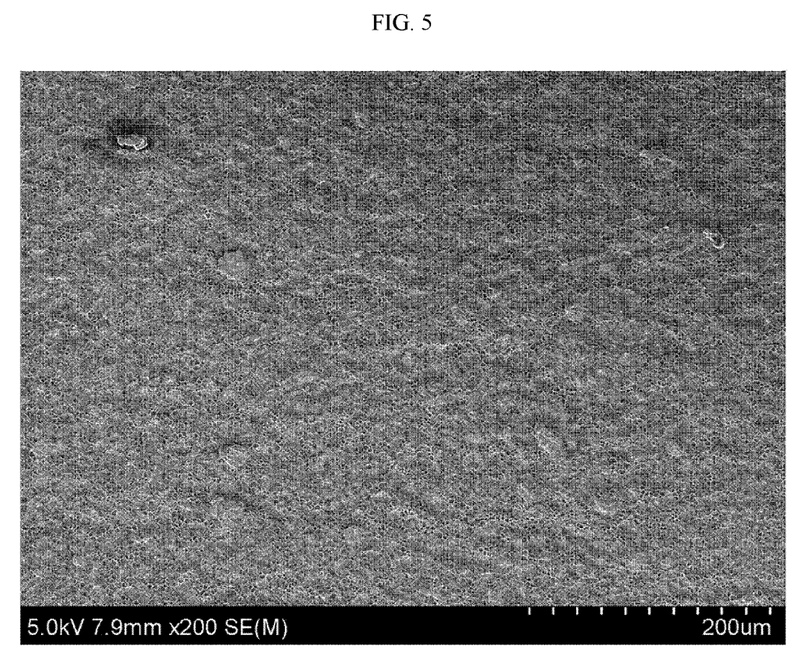
FIG. 5 is a scanning electron microscopic (SEM) image illustrating the surface of the separator according to Comparative Example 1.

FIG. 4 is a scanning electron microscopic (SEM) image illustrating the surface of the separator according to Example 1. It can be seen from FIG. 4 that secondary particles having a predetermined size are generated at a low ratio. Meanwhile, FIG. 5 is a scanning electron microscopic (SEM) image illustrating the surface of the separator according to Comparative Example 1. It can be seen from FIG. 5 by comparing with FIG. 4 that secondary particles formed by aggregation of primary particles protrude from the separator surface.

(4) Determination of Dielectric Breakdown Voltage

A separator specimen was prepared from each of Examples and Comparative Examples, and the dielectric breakdown voltage of each separator specimen was determined by using AC/DC/IR Hi-Pot tester.

The initial dielectric breakdown voltage was determined by measuring a voltage where a short-circuit occurs, when DC current of 0.5 mA is subjected to voltage boosting at a rate of 100 V/s (voltage 3 kV, ramp up time 30 seconds) at a temperature of 80° C.

Meanwhile, the dielectric breakdown voltage after compression was determined by measuring a voltage where a short-circuit occurs, when DC current of 0.5 mA is subjected to voltage boosting at a rate of 100 V/s (voltage 3 kV, ramp up time 30 seconds) at a temperature of 80° C., while pressurizing the separator in a range of 10 MPa.

In addition, ratio (A) was calculated according to the following Formula 1:

Ratio (A) (%)=[(Initial dielectric breakdown voltage before compression−Dielectric breakdown voltage after compression)/(Initial dielectric breakdown voltage before compression)]×100     [Formula 1]

(5) Determination of Adhesion to Electrode

A negative electrode was prepared as follows. A negative electrode active material (graphite), a conductive material (super P) and a binder (CMC/SBR mixed at a weight ratio of 1:1) were introduced to a solvent (water) at a weight ratio (wt %) of 97.5:1.5:1, followed by mixing (2000 rpm, 30 minutes), to prepare negative electrode slurry. The prepared negative electrode slurry was coated on copper film having a thickness of 20 μm by using a doctor blade and dried overnight at 110° C. The negative electrode was controlled to a thickness of about 100-110 μm, and pressing was carried out by using a roll press to a final thickness of about 60-70 μm. The prepared electrode was allowed to stand in a vacuum drier at 80° C. for 4 hours. Then, the separator obtained from each of Examples and Comparative Examples was laminated with the negative electrode to prepare a separator-negative electrode laminate specimen. Each laminate specimen was prepared with a size of 2.5 cm×10 cm. A double-sided tape available from 3M Co. was attached to slide glass, and each specimen was attached thereto in such a manner that the separator side of each specimen might face the double-sided tape. A UTM (universal testing machine) was used under the conditions of 10 N load cell and 180° mode at a speed of 300 mm/min.

TABLE 1

| | Largest particle diameter of secondary particles in inorganic coating layer | Frequency of secondary particles in separator | Particle size of composite particles (μm) | | Adhesion to electrode (gf/25 mm) | A value (%) |
| --- | --- | --- | --- | --- | --- | --- |
| | | | $D_{50}$ | $D_{99}$ | | |
| Example 1 | 10 μm or less | 10 or less | 1.5 | 9.6 | 37 | 88.8 |
| Example 2 | 10 μm or less | 10-30 | 1.6 | 10.7 | 34 | 85.5 |
| Example 3 | 10 μm or less | 30 or more | 1.8 | 11.2 | 36 | 81.2 |
| Example 4 | 30 μm or less | 10 or less | 2.1 | 26.4 | 32 | 74.4 |
| Example 5 | 30 μm or less | 10-30 | 2.2 | 29.5 | 35 | 73.1 |
| Example 6 | 30 μm or less | 30 or more | 2.2 | 32.3 | 33 | 71.3 |
| Comp. Ex. 1 | Larger than 50 μm | 10 or less | 2.7 | 39.9 | 31 | 69.1 |
| Comp. Ex. 2 | Larger than 50 μm | 10-30 | 2.9 | 51.4 | 29 | 58.9 |
| Comp. Ex. 3 | Larger than 50 μm | 30 or more | 3.1 | 58.2 | 28 | 43.7 |

As can be seen from Table 1, in the case of Examples 1-6 in which the particle size $D_{50}$ and $D_{99}$ of the composite particles are controlled within the above-defined range according to the present disclosure, the diameter of the secondary particles formed in the inorganic coating layer in each separator is smaller as compared to the diameter of the secondary particles in Comparative Examples 1-3. In the case of Examples 1-6, if any secondary particles are present in the inorganic coating layer, they have a diameter of 30 μm or less. Particularly, in the case of Examples 1-3, if any secondary particles are present, they have a diameter of 10 μm or less. However, in the case of Comparative Examples 1-3, secondary particles having a diameter of larger than 50 μm are observed. In addition, it can be seen that each of Examples 1-6 provides a ratio of dielectric breakdown voltage before and after compression, i.e. A value, of 70% or more, which is higher as compared to Comparative Examples 1-3.

What is claimed is:

1. A separator for an electrochemical device, comprising:
a porous substrate having a plurality of pores; and
a porous inorganic coating layer on one surface or both surfaces of the porous substrate,
wherein the porous inorganic coating layer comprises a plurality of inorganic particles and a binder resin positioned on a whole or a part of a surface of the plurality of inorganic particles to connect and fix the plurality of inorganic particles with one another,
wherein the plurality of inorganic particles are present in an amount of 50 wt % or more based on 100 wt % of a total weight of the porous inorganic coating layer, and the separator has a ratio of dielectric breakdown voltage after compression based on a dielectric breakdown voltage before compression of 70% or more,
wherein the dielectric breakdown voltage before compression is a voltage where a short-circuit occurs, when the separator is subjected to voltage boosting at a predetermined rate by applying DC current thereto, and the dielectric breakdown voltage after compression is a voltage where a short-circuit occurs, when the separator is subjected voltage boosting at a predetermined ratio by applying DC current thereto, while pressurizing the separator in a range of 1 MPa to 10 MPa, wherein secondary particles formed by aggregation of inorganic particles of the plurality of the inorganic particles have a diameter of 50 μm or less, and wherein the plurality of inorganic particles have a particle diameter ($D_{50}$) of 0.2 μm to 3 μm.

2. The separator for an electrochemical device according to claim 1, wherein no secondary particles are present on a surface of the porous inorganic coating layer.

3. The separator for an electrochemical device according to claim 1, wherein the secondary particles protrude from the separator surface to a height of 3 μm or less.

4. The separator for an electrochemical device according to claim 1, having an adhesion to an electrode of 15 gf/25 mm to 200 gf/25 mm.

5. The separator for an electrochemical device according to claim 1, wherein the binder resin comprises at least one of a fluorinated binder resin, and the fluorinated binder resin comprises any one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene.

6. The separator for an electrochemical device according to claim 5, wherein the fluorinated binder resin has a molecular weight ranging from 200,000-1,500,000.

7. The separator for an electrochemical device according to claim 6, wherein the fluorinated binder resin is polyvinylidene fluoride-co-hexafluoropropylene (PVDF-HFP) and has a substitution ratio with HFP ranging from 3 wt % to 30 wt %.

8. An electrochemical device comprising:
a positive electrode,
a negative electrode, and
a separator interposed between the positive electrode and the negative electrode,
wherein the separator is the same as defined in claim 1.

9. The electrochemical device according to claim 8, which is a lithium secondary battery.

10. A method for manufacturing the separator for an electrochemical device as defined in claim 1, comprising the steps of:

preparing a composition comprising a solvent, inorganic particles and a binder resin; and applying the composition to a surface of a porous substrate to form an inorganic coating layer, and drying the inorganic coating layer, wherein the composition is prepared by adding the inorganic particles and the binder resin to the solvent, followed by agitating the composition, wherein the prepared composition comprises composite particles which have at least one of a particle diameter ($D_{50}$) of 2.5 μm or less or a particle diameter ($D_{99}$) of 35 μm or less, and wherein the composite particle is formed by aggregation of the inorganic particles and/or the binder resin in the composition.

11. The method for manufacturing the separator for an electrochemical device according to claim 10, wherein the binder resin comprises at least one of a fluorinated binder resin, and the fluorinated binder resin comprises any one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene.

12. The method for manufacturing the separator for an electrochemical device according to claim 11, wherein the fluorinated binder resin has a molecular weight ranging from 200,000-1,500,000.

13. The method for manufacturing the separator for an electrochemical device according to claim 12, wherein the fluorinated binder resin is polyvinylidene fluoride-co-hexafluoropropylene (PVDF-HFP) and has a substitution ratio with HFP ranging from 3 wt % to 30 wt %.

* * * * *